(12) United States Patent
Zhang et al.

(10) Patent No.: US 11,193,860 B2
(45) Date of Patent: Dec. 7, 2021

(54) GAS PURIFYING DEVICE AND ION MIGRATION SPECTROMETER

(71) Applicants: Nuctech Company Limited, Beijing (CN); Tsinghua University, Beijing (CN)

(72) Inventors: Qingjun Zhang, Beijing (CN); Yuanjing Li, Beijing (CN); Zhiqiang Chen, Beijing (CN); Ziran Zhao, Beijing (CN); Yinong Liu, Beijing (CN); Yaohong Liu, Beijing (CN); Lili Yan, Beijing (CN); Ge Li, Beijing (CN); Qiufeng Ma, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 132 days.

(21) Appl. No.: 16/314,063

(22) PCT Filed: Dec. 10, 2018

(86) PCT No.: PCT/CN2018/120066
§ 371 (c)(1),
(2) Date: Aug. 15, 2019

(87) PCT Pub. No.: WO2019/110023
PCT Pub. Date: Jun. 13, 2019

(65) Prior Publication Data
US 2021/0215582 A1 Jul. 15, 2021

(30) Foreign Application Priority Data
Dec. 8, 2017 (CN) .......................... 201711305599.X

(51) Int. Cl.
*G01N 1/34* (2006.01)
*G01N 1/22* (2006.01)
(Continued)

(52) U.S. Cl.
CPC .................. *G01N 1/34* (2013.01); *G01N 1/22* (2013.01); *G01N 1/44* (2013.01); *G01N 27/622* (2013.01)

(58) Field of Classification Search
CPC .......... G01N 1/34; G01N 1/22; G01N 27/622; G01N 1/44; G01N 33/0006; G01N 27/4175; G01D 18/00
(Continued)

(56) References Cited

U.S. PATENT DOCUMENTS

| 5,234,479 A * | 8/1993 | Henderson | B01D 53/261 95/105 |
| 7,799,117 B1 * | 9/2010 | Li | B01D 53/0462 95/96 |

(Continued)

FOREIGN PATENT DOCUMENTS

| CN | 103512947 A | 1/2014 |
| CN | 103515182 A | 1/2014 |

(Continued)

OTHER PUBLICATIONS

International Search Report and Written Opinion of the International Searching Authority for International Patent Application No. PCT/CN2018/120066 dated Feb. 27, 2019, 14 pages.

(Continued)

*Primary Examiner* — Robert R Raevis
(74) *Attorney, Agent, or Firm* — Merchant & Gould P.C.

(57) ABSTRACT

Embodiments of the present disclosure provide a gas purifying device and an ion migration spectrometer. The gas purifying device includes a first purificant vessel, a second purificant vessel and a valve communicated between the first purificant vessel and the second purificant vessel. The valve is configured to allow a gas flows from the second purificant vessel to the first purificant vessel in a first state and to
(Continued)

permit the gas to flow from the first purificant vessel to the second purificant vessel in a second state.

15 Claims, 2 Drawing Sheets

(51) Int. Cl.
  *G01N 1/44* (2006.01)
  *G01N 27/622* (2021.01)

(58) Field of Classification Search
  USPC .... 73/1.07, 863, 863.24; 95/20, 68, 74, 212, 95/276, 99, 106, 114, 115, 119, 120–126; 96/126–128, 146, 228, 425–428
  See application file for complete search history.

(56) References Cited

U.S. PATENT DOCUMENTS

2003/0155504 A1  8/2003  Motchkine et al.
2015/0290577 A1* 10/2015  Hirai .................. B01D 53/263
                                                96/122

FOREIGN PATENT DOCUMENTS

| CN | 106872219 A | 6/2017 |
| CN | 107884469 A | 4/2018 |
| CN | 207923777 U | 9/2018 |

OTHER PUBLICATIONS

First Office Action for corresponding Chinese Patent Application No. 201711305599.X dated Mar. 12, 2019, 15 pages.

* cited by examiner

GAS PURIFYING DEVICE AND ION MIGRATION SPECTROMETER

CROSS-REFERENCE TO RELATED APPLICATION

This application is a National Stage Application of PCT/CN2018/120066, filed 10 Dec. 2018, which claims benefit of Serial No. 201711305599.X, filed 8 Dec. 2017 in China and which applications are incorporated herein by reference. A claim of priority is made to each of the above disclosed applications.

TECHNICAL FIELD

The present disclosure relates to the field of detection, and in particular, to a gas purifying device and an ion migration spectrometer.

BACKGROUND

Gas purifying device is usually used to purify a gas that will be passed to a trace detection apparatus such as an ion migration spectrometer in order to maintain clean of the gas and the apparatus. Gas purification relates to remove water and impurity in a gas by using a purificant in a gas purifying device to obtain a zero gas (that is, a purified gas in which no component to be inspected or no matter that may interfere the detection is included). In this process, the purificant may be regenerated by heating to achieve cyclic utilization.

There are two type of existing ion migration spectrometers, one including a single gas purifying device in which a purificant is placed to purify a gas and which needs to be shut down for a short time period for regularly replacement of the purificant, thereby continuous operation being broken and maintain cost being increased; the other including two gas purifying devices in which purificants are respectively placed for purifying gas and which are configured to allow one of them to be operating while the other is shut down to replace the purificant, that is, the other ion migration spectrometer still needs to be shut down for replacement of the purificant by a worker and cannot work continuously, and meanwhile the purificant cannot be regenerated to be cyclically used. Generally, the gas purifying device in the existing ion migration spectrometer needs to be replaced by a person, which results in low working efficiency and high cost.

SUMMARY

According to an aspect of the present disclosure, there is provided a gas purifying device including:

a first purificant vessel containing a purificant for purifying a gas, and configured to purify the gas during a pass of the gas through the first purificant vessel;

a second purificant vessel containing a purificant for purifying a gas, and configured to purify the gas during a pass of the gas through the second purificant vessel; and a valve communicated between the first purificant vessel and the second purificant vessel, and configured to permit the gas to flow from the second purificant vessel to the first purificant vessel in a first state and to permit the gas to flow from the first purificant vessel to the second purificant vessel in a second state.

In an embodiment, the first purificant vessel includes a first heater configured to heat the first purificant in the first purificant vessel in the first state; and the second purificant vessel includes a second heater configured to heat the second purificant in the second purificant vessel in the second state.

The first purificant vessel is configured to purify the gas passing through the first purificant vessel in the second state and to allow, in the first state, the passed gas to take away water vapor and impurity generated from the purificant in the first purificant vessel due to heating of the purificant; and the second purificant vessel is configured to purify the gas passing through the second purificant vessel in the first state and to allow, in the second state, the passed gas to take away water vapor and impurity generated from the purificant in the second purificant vessel due to heating of the purificant.

In an embodiment, the gas purifying device is adaptive to be connected with an analysis device which is disposed between the first purificant vessel and the second purificant vessel, the gas purifying device and the analysis device are configured:

such that, under the first state of the valve, the gas flows out of the second purificant vessel, the purified gas passes through the valve and enters the analysis device, and then the gas discharged from the analysis device flows towards the first purificant vessel; and such that, under the second state of the valve, the gas flows out of the first purificant vessel, the purified gas passes through the valve and enters the analysis device, and then the gas discharged from the analysis device flows towards the second purificant vessel.

In an embodiment, the gas purifying device is configured such that, under the first state and drive of the valve, the gas enters the second purificant vessel through a second purificant vessel second end, flows out of the second purificant vessel through a second purificant vessel first end, enters a first port of the valve and is discharged from a second port of the valve, subsequently enters the analysis device and then enters the valve through a third port of the valve, is discharged from a fourth port of the valve, flows towards the first purificant vessel to enter the first purificant vessel through a first purificant vessel first end, and exits from a first purificant vessel second end; and under the second state and drive of the valve, the gas enters the first purificant vessel through the first purificant vessel second end and flows out of the first purificant vessel through the first purificant vessel first end, enters the fourth port of the valve, is discharged from the second port of the valve, enters the analysis device, subsequently passes through the analysis device into the valve through the third port of the valve, is discharged from the first port of the valve towards the second purificant vessel, enters the second purificant vessel through the second purificant vessel first end and exits from the second purificant vessel second end.

In an embodiment, the gas purifying device further includes one or more pump configured to drive the gas to flow between the first purificant vessel and the second purificant vessel.

In an embodiment, the gas purifying device includes one pump connected between the first purificant vessel and the second purificant vessel and configured to drive the gas for flowing under the first state or the second state.

In an embodiment, the valve is a four-way electromagnetic valve, which is in an off-energized state under the first state and is in an energized state under the second state.

In an embodiment, the first purificant vessel further includes a first housing in which the first purificant is received; and the second purificant vessel further includes a second housing in which the second purificant is received.

In an embodiment, the gas purifying device includes a casing including a first port in which the first purificant vessel is located and a second portion in which second purificant vessel is located.

In an embodiment, the gas purifying device further includes a first heat insulating layer configured to enclose all or part of the first purificant vessel to stop heat exchange between the first purificant and the outside ambient; and a second heat insulating layer configured to enclose all or part of the second purificant vessel to stop heat exchange between the second purificant and the outside embient.

In an embodiment, the gas purifying device further includes a first temperature sensor configured to measure temperature of the first purificant so as to control the temperature of the first purificant in cooperation with a first heater; and a second temperature sensor configured to measure temperature of the second purificant so as to control the temperature of the second purificant in cooperation with a second heater.

In an embodiment, the gas purifying device further includes a first humidity sensor configured to measure humidity of the first purificant; and a second humidity sensor configured to measure humidity of the second purificant.

According to an aspect of the present disclosure, there is provided an analysis apparatus including the above mentioned gas purifying device and the analysis device, wherein the analysis device is connected between the first purificant vessel and the second purificant vessel such that the gas that passes through one of the first purificant vessel and the second purificant vessel flows into the analysis device for analysis and the gas that is discharged from the analysis device enters the other of the first purificant vessel and the second purificant vessel.

In an embodiment, the analysis device is configured between the first purificant vessel and the second purificant vessel and such that under the first state and the drive of the valve, the gas passes through the second purificant vessel and the purified gas flows to the analysis device via the valve, and the gas out of the valve flows towards the first purificant vessel; and under the second state and the drive of the valve, the gas passes through the first purificant vessel and the purified gas flows to the analysis device via the valve, and the gas out of the valve flows towards the second purificant vessel.

In an embodiment, the pump connected between the first purificant vessel and the second purificant vessel is disposed at downstream of the analysis device in a direction the gas flows and configured to drive the gas to flow under the first state or the second state.

In an embodiment, the analysis device includes an ion migration tube or a spectrum analyzer.

DETAILED DESCRIPTION OF THE EMBODIMENTS

Figure 1:
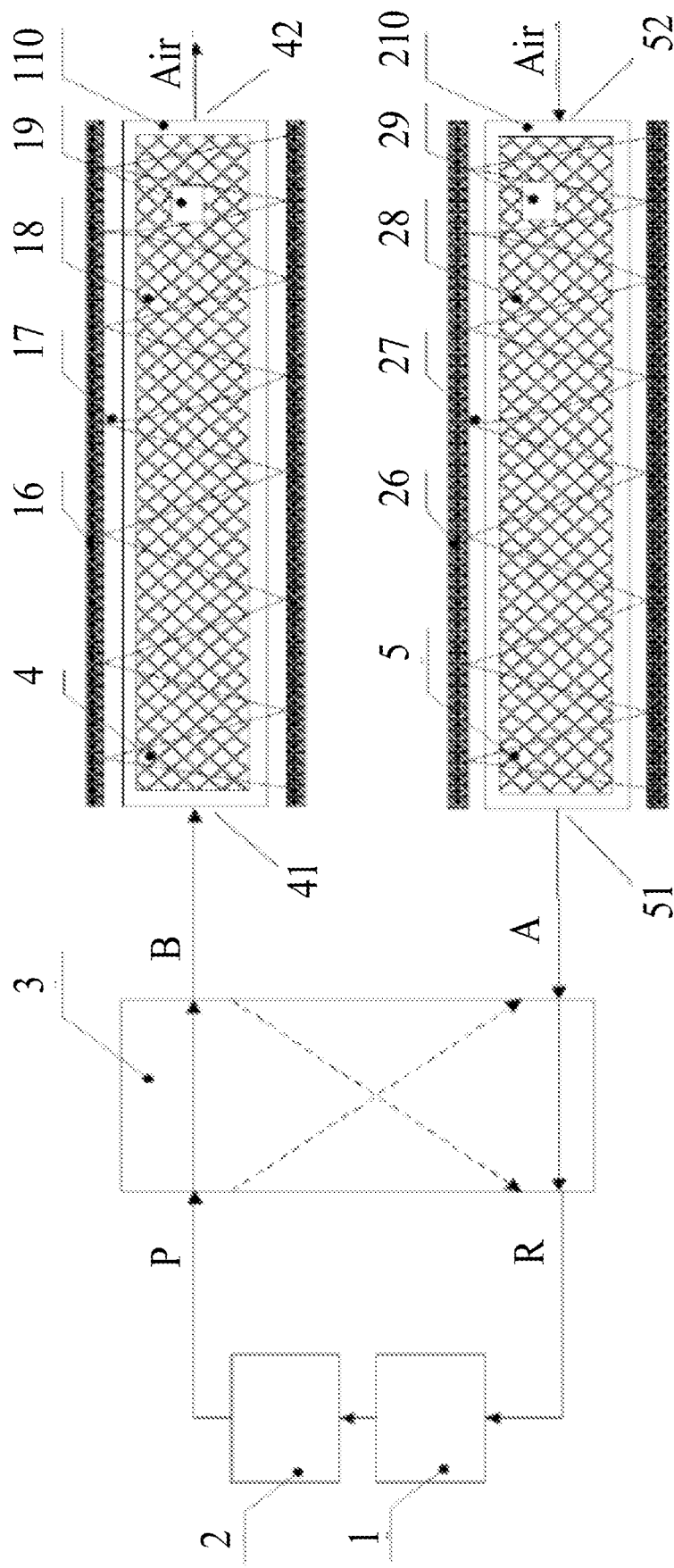
FIG. 1 illustrates a structural schematic view of a gas purifying device according to an embodiment of the present disclosure, in which a first purificant vessel is in a heating state.

Although various modifications and replacements to embodiments of the present disclosure are allowed, the present disclosure are illustrated by some embodiments in a manner of example in the drawings and described in detail in the text herein. However, it is understood that the attached drawings and detailed description are not intended to limit the present disclosure to the embodiments, instead of, to cover all modifications, equivalents and replacements that fall into spirits and scope defined by the attached claims. The drawings are provided for illustration rather than drawn in scale.

In the present text, terms of "first", "second" are used for distinguish different components, instead of order or limiting significance or relationship between primary and secondary. Further, in the text, terms of "top" and "bottom" are provided with relative to each other, such as, respectively referring to upper side and low side of an object.

Embodiments of the present disclosure will be described below with reference to the drawings.

Figure 2:
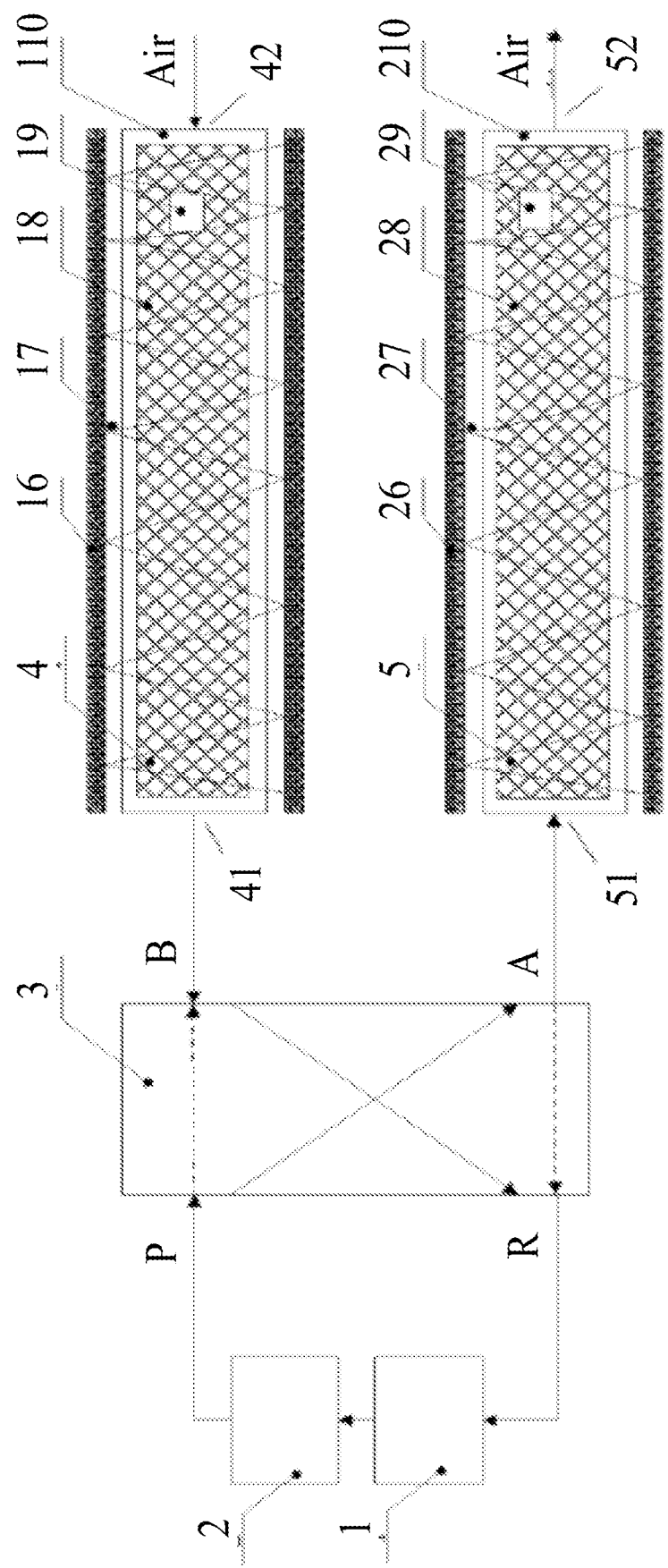
FIG. 2 illustrates a structural schematic view of a gas purifying device according to an embodiment of the present disclosure, in which a second purificant vessel is in a heating state.

Referring to FIG. 1 and FIG. 2, embodiments of the present disclosure provide a gas purifying device, including:

a first purificant vessel 4 containing a purificant for purifying a gas, and configured to purify the gas during a pass of the gas through the first purificant vessel;

a second purificant vessel 5 containing a purificant for purifying a gas, and configured to purify the gas during a pass of the gas through the second purificant vessel; and a valve 3 communicated between the first purificant vessel 4 and the second purificant vessel 5 and configured to permit the gas to flow from the second purificant vessel 5 to the first purificant vessel 4 in a first state and permit the gas to flow from the first purificant vessel 4 to the second purificant vessel 5 in a second state.

According to the embodiment, the first purificant vessel 4 and the second purificant vessel 5 are connected with each other via the valve 3 such that the gas may be purified by the first purificant vessel 4 and then the gas, after being used, may flow through the second purificant vessel 5 so as to purify the second purificant vessel 5, and vice versa, i.e., such that the gas may be purified by the second purificant vessel 5 and then the gas, after being used, may flow through the first purificant vessel 4 so as to purify the first purificant vessel 4. With this configuration, manual replacement of the purificant as done in the prior art may be avoided, and instead, a simple switch of the valve is needed to change a flowing direction of the gas so as to purify the gas while purifying the one, which is not used to purify the gas, of the first purificant vessel 4 and the second purificant vessel 5 by the used gas. Thus, a great convenience in practice may be achieved.

According to an embodiment of the present disclosure, the gas may be purified or adsorbed after flowing through the first purificant vessel 4 or the second purificant vessel 5 and then the gas that is purified or adsorbed by the purificant may be used as a carrier gas, for example, the purified gas may be passed into an analysis device.

For example, in an embodiment of the disclosure, the gas purifying device is connected with an analysis device so that they constitute an analysis apparatus. In another embodiment of the present disclosure, the gas purifying device includes an analysis device port, which is provided between the first purificant vessel 4 and the second purificant vessel 5 and adaptive to be connected to an analysis device, and which is further configured to maintain communication of a gas path in case that no analysis device is connected.

When an analysis device is provided between the first purificant vessel 4 and the second purificant vessel 5, the gas purifying device is configured such that: when the valve 3 is in the first state, the gas passes through the second purificant vessel 5 and the purified gas flows through the valve 3 and enters the analysis device, and the gas discharged by the analysis device flows towards the first purificant vessel 4, and such that: when the valve 3 is in the second state, the gas passes through the first purificant vessel 4 and the purified gas flows through the valve 3 and enters the analysis device, and the gas discharged by the analysis device flows towards the second purificant vessel 5. The analysis device may be, for example, an ion migration tube 1, or a spectrum analyzer or other device that may make an analysis on a gas.

In the embodiment, when the valve 3 is in the first state, the gas passes through the second purificant vessel 5 and then the purified gas flows through the valve 3 and enters such as an analysis device, and the gas discharged from the analysis device may flow to the first purificant vessel 4 to be used again, such as for purifying the first purificant vessel 4; in reverse, when the valve 3 is in the second state, the gas passes through the first purificant vessel 4 and then the purified gas flows through the valve 3 and enters the analysis device, and the gas discharged from the analysis device may flow to the second purificant vessel 5 to be used again, for example for purifying the second purificant vessel 5. It is known that the gas purifying device according to the embodiment may be not provided with any analysis device and may be operated without any analysis device. In fact, an analysis device may be conveniently connected to the purifying device when used. In the present disclosure, the purifying device is described with the analysis device being connected in the gas path for convenience of implement of the gas purifying device according to the present disclosure by those skilled in the art. Obviously, based on the teaching of the present disclosure, those skilled in the art may add any type of analysis device to the gas purifying device according to the present disclosure.

As we know, the purificant is needed to be cleaned or regenerated after a time period usage. According to an embodiment, for example, the gas is firstly purified by the first purificant vessel 4 and the purificant in the first purificant vessel 4 is needed to be cleaned or regenerated after a time period usage. In this case, the valve 3 is adjusted such that the second purificant vessel 5 is used to purify the gas and the gas discharged from the analysis device (or the gas that is purified by the second purificant vessel 5) is passed to the first purificant vessel 4 and thus purify a first purificant 18 in the first purificant vessel 4; and vice versa.

In an embodiment of the present disclosure, the gas purifying device may further include a heating device, that is, the first purificant vessel 4 includes a first heater 17 configured to heat the first purificant 18 in the first purificant vessel 4; the second purificant vessel 5 includes a second heater 27 configured to heat a second purificant 28 in the second purificant vessel 5.

The purificant may be regenerated by volatilizing water vapor and volatile organic compounds (VOC) therein by heating the purificant and passing a gas through the purificant to blow and remove the volatilized water vapor and volatile organic compounds, and thereby be increased in efficiency. In addition, it is advantage to effectively regenerate the purificant and improve effect of cleaning it by heating. According to the embodiment, the gas purifying device is provided with the first heater 17 to heat the first purificant 18 in the first purificant vessel 4 and the second heater 27 to heat the second purificant 28 in the second purificant vessel 5 such that the gas may be purified while rapidly and effectively cleaning the purificant.

In an embodiment, the first heater 17 may be an electric heating wire, which passes through the first purificant 18 and is arranged in the first purificant 18 in a manner of meander so as to evenly heat the first purificant 18; the second heater 27 may be an electric heating wire, which passes through the second purificant 28 and is arranged in the second purificant 28 in a manner of meander so as to evenly heat the second purificant 28.

In another embodiment, the first heater 17 may include a plurality of electric heating blocks which are dispersedly and evenly distributed in the first purificant 18 so as to evenly heat the first purificant 18; the second heater 27 may include a plurality of electric heating blocks which are dispersedly and evenly distributed in the second purificant 28 so as to evenly heat the second purificant 28.

Specifically, the gas purifying device is configured such that: when the valve 3 is in the first state, the gas enters the second purificant vessel 5 via a second purificant vessel second end 52, flows out of the second purificant vessel 5 from a second purificant vessel first end 51, enters a first port A of the valve 3, flows out of a second port R of the valve 3, enters the analysis device (for example, an ion migration tube 1), and then the gas enters the valve 3 via a third port P of the valve 3, flows out of a fourth port B of the valve 3 towards the first purificant vessel 4, enters the first purificant vessel 4 via a first purificant vessel first end 41, and flows out of a first purificant vessel second end 42 and meanwhile, the first heater 17 heats the first purificant 18.

In an embodiment, the valve 3 may be a four-way electromagnetic valve 3. The four-way electromagnetic valve 3 being in the first state means that the four-way magnetic valve 3 is in an off-energized state; and the four-way electromagnetic valve 3 being in the second state of the means that the four-way electromagnetic valve 3 is in an energized state. As shown in FIG. 1, when the four-way electromagnetic valve 3 is in an off-energized state, the gas may flow from the first port A towards the second port R of the four-way electromagnetic valve 3 and flow from the third port P to the fourth port B of the valve 3; and, the four-way electromagnetic valve 3 is in the second state, i.e., be in the energized state, the gas may flow from the fourth port B towards the second port R of the four-way electromagnetic valve 3 and flow from the third port P to the first port A of the valve 3. It is advantage to provide the four-way electromagnetic valve 3 as the gas purifying device having a simple structure may be obtained.

For example, in another embodiment of the present disclosure, the valve 3 may be a two-position three-way electromagnetic valve 3 and four the two-position three-way electromagnetic valves 3 are provided. Those skilled in the art may configure the gas flow path according to the requirements described above and however, the structure of the device will be more complex than the above embodiment.

In an embodiment of the present disclosure, the gas purifying device may further include a pump 2, which may be connected between the first purificant vessel 4 and the second purificant vessel 5 at a position downstream of the analysis device in the direction in which the gas flows and configured to drive the gas to flow under the first state or the second state. Provision of the pump 2 is advantage as, under action of the pump 2, the gas may flow within the gas purifying device achieving purification of the gas and self-cleaning/regeneration of the gas purifying device. It is advantage to dispose the pump 2 at a position downstream of the analysis device in the direction in which the gas flows as the gas may be avoided to be polluted by the pump 2. In the embodiment, the pump 2 is provided such that one pump 2 may achieve promotion of the flow of the gas.

In another embodiment of the present disclosure, one pump may be provided at the first purificant vessel second end 42 of the first purificant vessel while another pump may be provided at the second purificant vessel second end 52 of the second purificant vessel. Provision of two pumps may also achieve flow of the gas within the gas purifying device. However, according to the present disclosure, it is advantage to provide one pump located between the first purificant vessel and the second purificant vessel and at a position downstream of the analysis device to simplify the structure of the whole device and reduce cost.

In an embodiment of the gas purifying device of the present disclosure, the first purificant vessel 4 may further include a first housing 110 within which the first purificant 18 is received; and the second purificant vessel 5 may further include a second housing 210 within which the second purificant 28 is received. However, it is known that the gas purifying device may include one casing in which the first purificant vessel 4 is located in a first portion of the casing and the second purificant vessel 5 is located in a second portion of the casing.

The first housing 110 and the second housing 210 may be made of insulating materials, preferably, thermal insulating materials.

In an embodiment of the present disclosure, the gas purifying device includes a first heat insulating layer configured to enclose all or part of the first purificant vessel so as to prevent heat exchange between the first purificant 18 and the outside environment; and a second heat insulating layer configured to enclose all or part of the second purificant vessel 5 so as to prevent heat exchange between the second purificant 28 and the outside environment.

In an embodiment of the present disclosure, the first housing 110 includes a first heat insulating layer 16 configured to enclose all or part of the first purificant vessel 4 so as to prevent heat exchange between the first purificant 18 and the outside environment (that is, absolutely or substantively restrain the heat exchange between the first purificant 18 and the environment outwardly relative to the first heat insulating layer 16 such that substantively only a portion of the first heater 17 that extends into the first heat insulating layer 16 may heat the first purificant 18); and the second housing 210 includes a second heat insulating layer 26 configured to enclose all or part of the second purificant vessel 5 so as to stop thermal exchange between the second purificant 28 and the outside environment.

It is advantage to provide the first heat insulating layer 16 and the second heat insulating layer 26 to increase efficiency of the heaters so as to increase heating speed.

In an embodiment of the present disclosure, the gas purifying device may further include: a first temperature sensor 19 configured to measure a temperature of the first purificant 18 so as to control the temperature of the first purificant 18 together with the first heater 17; and, a second temperature sensor 29 configured to measure a temperature of the second purificant 28 so as to control the temperature of the second purificant 28 together with the second heater 27. It is advantage to provide the temperature sensors as cooperation of the first heater 17 with the first temperature sensor 19 may control the temperature of the first purificant 18 at a value as required such that the gas may more effectively purify the first purificant 18 when passing through the first purificant 18 and thus achieves regeneration of the first purificant 18 as soon as possible and extends service life of the purificant.

In an embodiment of the present disclosure, the gas purifying device may further include a first humidity sensor configured to measure humidity of the first purificant 18 and, a second humidity sensor configured to measure humidity of the second purificant 28. It is advantage to provide the first humidity sensor to monitor the humidity of the first purificant 18 so as to clean and treat the first purificant 18 in time, which is favor to extending the service life of the first purificant 18. Similarly, the second humidity sensor is favor to monitoring the humidity of the second purificant 28 so as to clean the second purificant 28 in time and thus extending the service life of the second purificant 28.

In another embodiment of the present disclosure, the first temperature sensor 19 and the first humidity sensor is integrated together as one piece, for example as shown by reference symbol 19 in the drawings; and the second temperature sensor 29 and the second humidity sensor is integrated together as one piece, for example as shown by reference symbol 29 in the drawings.

According to another aspect of the present disclosure, there is provided an ion migration spectrometer including the above mentioned gas purifying device. In an embodiment, the ion migration spectrometer is connected between the first purificant vessel 4 and the second purificant vessel 5 such that the gas that is purified by one of the first purificant vessel 4 and the second purificant vessel 5 may enter the ion migration spectrometer for measurement and the gas discharged from the ion migration spectrometer may enter the other of the first purificant vessel 4 and the second purificant vessel 5.

A structure combining the gas purifying device according to the present disclosure and the ion migration tube 1 is described with reference to FIG. 1 and FIG. 2.

FIG. 1 shows the gas purifying device in which the first purificant vessel 4 is in a heating and regenerating state, the second purificant vessel 5 is in an adsorbing state, the two-position four-way electromagnetic valve 3 is in an off-energized state and the first heater 17 of the first purificant vessel 4 is in an energized and heating state. The gas flows as following: the gas flows through the second purificant 28 of the second purificant vessel 5, in which the water vapor and the impurity is adsorbed by the second purificant 28 and the gas is cleaned, then the cleaned gas flows to the first port A of the two-position four-way electromagnetic valve 3 and then to the second port R thereof, the gas out of the second port R enters the ion migration tube 1 as an migration gas and carrier gas of the ion migration tube 1, leaves the ion migration tube 1 from its discharge tube and flows towards the pump 2, the gas discharged from the pump 2 enters the third port P and flows to the fourth port B of the two-position four-way electromagnetic valve 3, subsequently the gas flows through the first purificant 18 of the first purificant vessel 4 thereby blowing and cleaning the first purificant 18 that is being heated and regenerated and thus bringing away the water and impurity from the first purificant 18 to outside ambient.

FIG. 2 shows the gas purifying device in which the first purificant vessel 4 is in an adsorbing state, the second purificant vessel 5 is in a heating and regenerating state, the two-position four-way electromagnetic valve 3 is in an energized state and the second heater 27 of the second purificant vessel 5 is in an energized and heating state. The gas flows as following: the gas flows through the first purificant 18 of the first purificant vessel 4, in which the water vapor and the impurity is adsorbed by the first purificant 18 and the gas is cleaned, then the cleaned gas flows to the fourth port B of the two-position four-way electromagnetic valve 3 and then to the second port R thereof, the gas flowing out of the second port R enters the ion migration tube 1 as an migration gas and carrier gas of the ion migration tube 1, leaves the ion migration tube 1 from its discharge tube and flows towards a gas intake port of the pump 2, the gas discharged from the pump 2 enters the third port P and flows to the first port A of the two-position four-way electromagnetic valve 3, subsequently the gas flows through the second purificant 28 of the second purificant vessel 5 while blowing and cleaning the second purificant 28 that is being heated and regenerated and thus bringing away the water and impurity from the second purificant 28 to outside ambient.

As mentioned above, the gas purifying device according to the embodiments of the present disclosure may realize purification of gas/air while achieving purification and regeneration of its own first purificant or the second purificant, such that purification of the gas and the regeneration of its own purificant may be simultaneously done without shutting down and manually replacing the purificant in the purificant vessel, thereby reducing usage of the purificant and simplifying operation. Further, as the purificant may be cleaned in time and operation is simplified, service time of the gas purifying device is extended and down time is reduced. Furthermore, it is noted that the gas purifying device may be of environment friend as the gas may be cleaned and used during working.

Although the embodiments of the general invention concept have been described and illustrated, it is understood that the embodiments of the present disclosure may be modified without departing from the principle and spirits of the present disclosure. The scope of the present disclosure may be defined by the claims and their equivalents.

The invention claimed is:

1. A gas purifying device, comprising:
a first purificant vessel containing a purificant for purifying a gas, and configured to purify the gas during a pass of the gas through the first purificant vessel;
a second purificant vessel containing a purificant for purifying a gas, and configured to purify the gas during a pass of the gas through the second purificant vessel; and
a valve communicated between the first purificant vessel and the second purificant vessel, and configured to permit the gas to flow from the second purificant vessel to the first purificant vessel in a first state and to permit the gas to flow from the first purificant vessel to the second purificant vessel in a second state,
wherein the valve is a four-way electromagnetic valve, which is in an off-energized state under the first state and is in an energized state under the second state.

2. The gas purifying device as claimed in claim 1, wherein,
the first purificant vessel comprises a first heater configured to under the first state heat the first purificant in the first purificant vessel; and
the second purificant vessel comprises a second heater configured to under the second state heat the second purificant in the second purificant vessel.

3. The gas purifying device as claimed in claim 2, further comprising a first temperature sensor configured to measure temperature of the first purificant so as to control the temperature of the first purificant in cooperation with a first heater, and a second temperature sensor configured to measure a temperature of the second purificant so as to control the temperature of the second purificant in cooperation with a second heater.

4. The gas purifying device as claimed in claim 1, wherein, the first purificant vessel is configured to purify the gas passing through the first purificant vessel in the second state and to allow, in the first state, the passed gas to take away water vapor and impurity generated from the purificant in the first purificant vessel due to heating of the purificant; and
the second purificant vessel is configured to purify the gas passing through the second purificant vessel in the first state and to allow, in the second state, the passed gas to take away water vapor and impurity generated from the purificant in the second purificant vessel due to heating of the purificant.

5. The gas purifying device as claimed in claim 1, wherein, the gas purifying device is adaptive to be connected with an analysis device which is disposed between the first purificant vessel and the second purificant vessel, the gas purifying device and the analysis device are configured:
such that, under the first state and drive of the valve, the gas flows out of the second purificant vessel, the purified gas passes through the valve and enters the analysis device, and then the gas discharged from the analysis device flows towards the first purificant vessel; and
such that, under the second state and drive of the valve, the gas flows out of the first purificant vessel, the purified gas passes through the valve and enters the analysis device, and then the gas discharged from the analysis device flows towards the second purificant vessel.

6. The gas purifying device as claimed in claim 5, wherein, the gas purifying device is configured such that,
under the first state and drive of the valve, the gas enters the second purificant vessel through a second purificant vessel second end, flows out of the second purificant vessel through a second purificant vessel first end, enters a first port of the valve and is discharged from a second port of the valve, subsequently enters the analysis device and then enters the valve through a third port of the valve, is discharged from a fourth port of the valve, flows towards the first purificant vessel to enter the first purificant vessel through a first purificant vessel first end, and exits from a first purificant vessel second end; and
under the second state and drive of the valve, the gas enters the first purificant vessel through the first purificant vessel second end and flows out of the first purificant vessel through the first purificant vessel first end, enters the fourth port of the valve, is discharged from the second port of the valve, enters the analysis device, subsequently passes through the analysis device into the valve through the third port of the valve, is discharged from the first port of the valve towards the second purificant vessel, enters the second purificant vessel through the second purificant vessel first end and exits from the second purificant vessel second end.

7. The gas purifying device as claimed in claim 1, further comprising a pump configured to drive the gas to flow between the first purificant vessel and the second purificant vessel.

8. The gas purifying device as claimed in claim 7, wherein the pump is connected between the first purificant vessel and the second purificant vessel and configured to drive the gas for flowing under the first state or the second state.

9. The gas purifying device as claimed in claim 1, wherein the first purificant vessel further comprises a first housing in which the first purificant is received; and the second purificant vessel further comprises a second housing in which the second purificant is received.

10. The gas purifying device as claimed in claim 1, wherein the gas purifying device comprises a casing including a first port in which the first purificant vessel is located and a second portion in which second purificant vessel is located.

11. The gas purifying device as claimed in claim 1, further comprising a first heat insulating layer configured to enclose all or part of the first purificant vessel to stop heat exchange between the first purificant and the outside environment, and a second heat insulating layer configured to enclose all or part of the second purificant vessel to stop heat exchange between the second purificant and the outside environment.

12. The gas purifying device as claimed in claim 1, further comprising a first humidity sensor configured to measure humidity of the first purificant, and a second humidity sensor configured to measure humidity of the second purificant.

13. An analysis apparatus comprising the gas purifying device as claimed in claim 1 and an analysis device, wherein the analysis device is connected between the first purificant vessel and the second purificant vessel such that the gas that passes through one of the first purificant vessel and the second purificant vessel flows into the analysis device for analysis and the gas that is discharged from the analysis device enters the other of the first purificant vessel and the second purificant vessel.

14. The analysis apparatus as claimed in claim 13, wherein a pump is disposed between the first purificant vessel and the second purificant vessel at a position downstream of the analysis device in a direction in which the gas flows and configured to under the first state or the second state drive the gas to flow.

15. The analysis apparatus as claimed in claim 13, wherein the analysis device comprises an ion migration tube or a spectrum analyzer.

* * * * *